United States Patent
Hughes

(10) Patent No.: US 6,521,132 B2
(45) Date of Patent: Feb. 18, 2003

(54) ION EXCHANGE WATER SOFTENER AND METHOD

(76) Inventor: Gilles Hughes, 310 Shadeland Ave., Apt. 1, Drexel Hill, PA (US) 19026

( * ) Notice: Subject to any disclaimer, the term of this patent is extended or adjusted under 35 U.S.C. 154(b) by 171 days.

(21) Appl. No.: 09/783,786

(22) Filed: Feb. 15, 2001

(65) Prior Publication Data

US 2002/0108909 A1 Aug. 15, 2002

(51) Int. Cl.[7] .......................... B01J 49/00; B01D 21/30
(52) U.S. Cl. .................. 210/673; 210/678; 210/687; 210/136
(58) Field of Search ................... 210/670, 673, 210/675, 676, 678, 687, 136

(56) References Cited

U.S. PATENT DOCUMENTS

| | | |
|---|---|---|
| 1,233,016 A | 7/1917 | Bartlett |
| 1,423,132 A | 7/1922 | Magrath |
| 1,611,622 A | 12/1926 | Duden |
| 1,703,451 A | 2/1929 | McGill |
| 1,873,305 A | 8/1932 | DeVille |
| 2,006,287 A | 6/1935 | Wilbanks |
| 2,347,201 A | 4/1944 | Lindsay |
| 2,627,503 A | 2/1953 | Anderson |
| 2,832,373 A | 4/1958 | Scholer |
| 3,342,336 A | 9/1967 | Rose |
| 4,698,272 A | 10/1987 | Inokuti et al. |

*Primary Examiner*—Chester T. Barry
(74) *Attorney, Agent, or Firm*—Schnader Harrison Segal & Lewis LLP

(57) ABSTRACT

A self-regenerating ion exchange water softener has a lower tank for a resin chamber and an upper tank for a regenerative salt chamber, with an opening positioned between them, and with a restrictive pressure-sensitive valve, sensitive to pressure of water in the resin chamber, having a restricted opening limiting flow of water upwardly into the regeneration chamber or downwardly into the resin chamber.

4 Claims, 2 Drawing Sheets

ION EXCHANGE WATER SOFTENER AND METHOD

Figure 1:
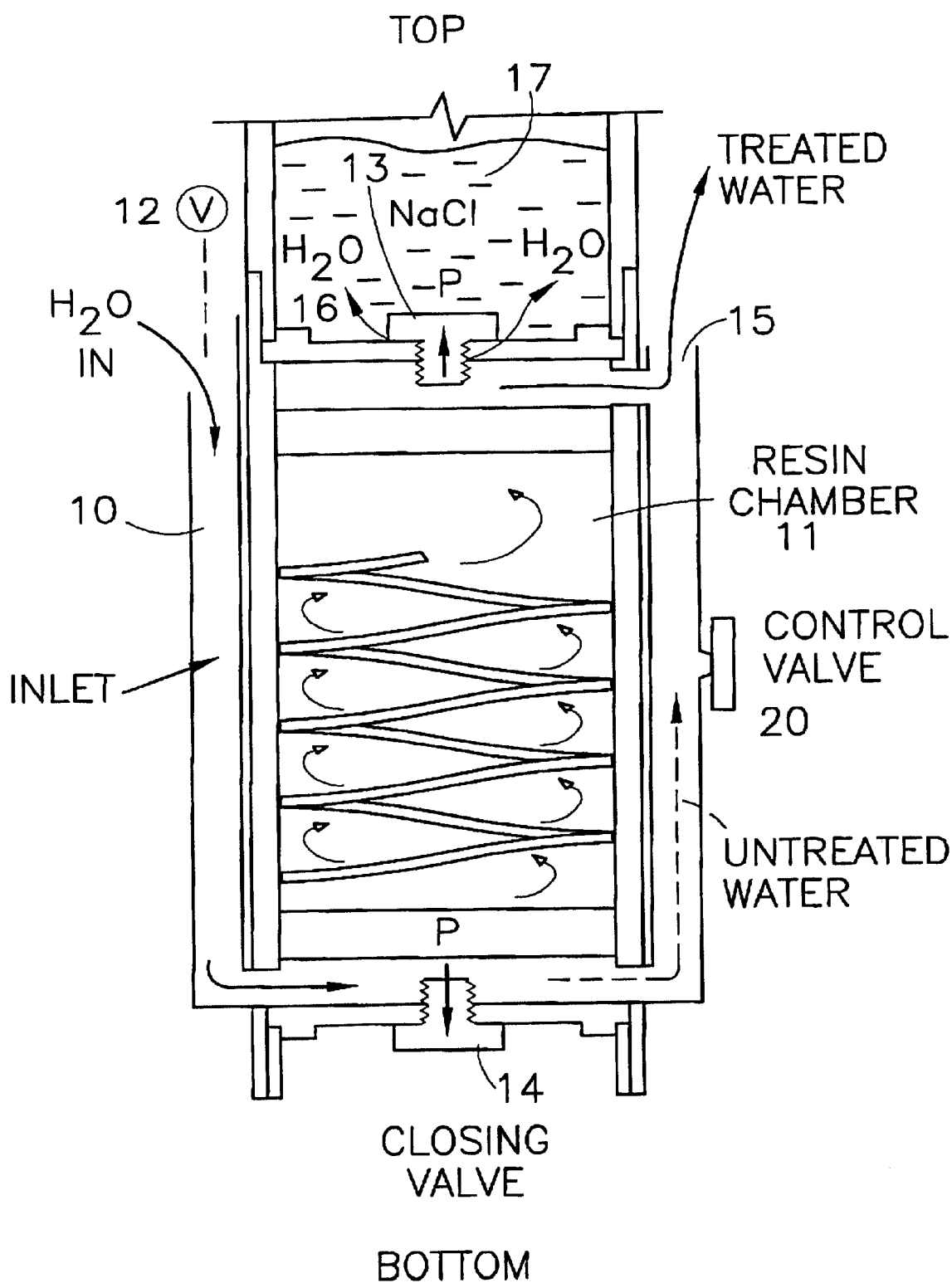

This invention relates to an ion exchange water softener, particularly a self-regenerating water softener, wherein an ion exchange resin, after being depleted through use in water softening, is automatically regenerated by the simple act by the user of turning the water on for purposes of use, and turning it off after use. This invention further relates to an automatic method for regenerating the resin.

It is not new to regenerate a zeolite bed used for water softening, or to use a brine, such as sodium chloride brine, to regenerate a zeolite bed contained in a tank. The patent to Duden U.S. Pat. No. 1,611,422 discloses a typical apparatus having a tank for the zeolite, a separate tank for salt and water, and a further separate compartment for the brine that is used to regenerate the zeolite.

The devices of the prior art involve a substantial amount of piping and valving, and require considerable manipulation on the part of the person using the softened water.

It is an object of this invention to avoid all such complications, and to make the regeneration of the zeolite automatic, as a simple on-off valve is turned on and off for the purpose of use of the softened water.

Another object of this invention is to provide a self-regenerating ion exchange water softener of any size or shape, which is not required to be permanently connected into the plumbing system of a house or factory, but which can be moved from place to place as desired, merely by being connected to a source of raw water under pressure.

Figure 2:
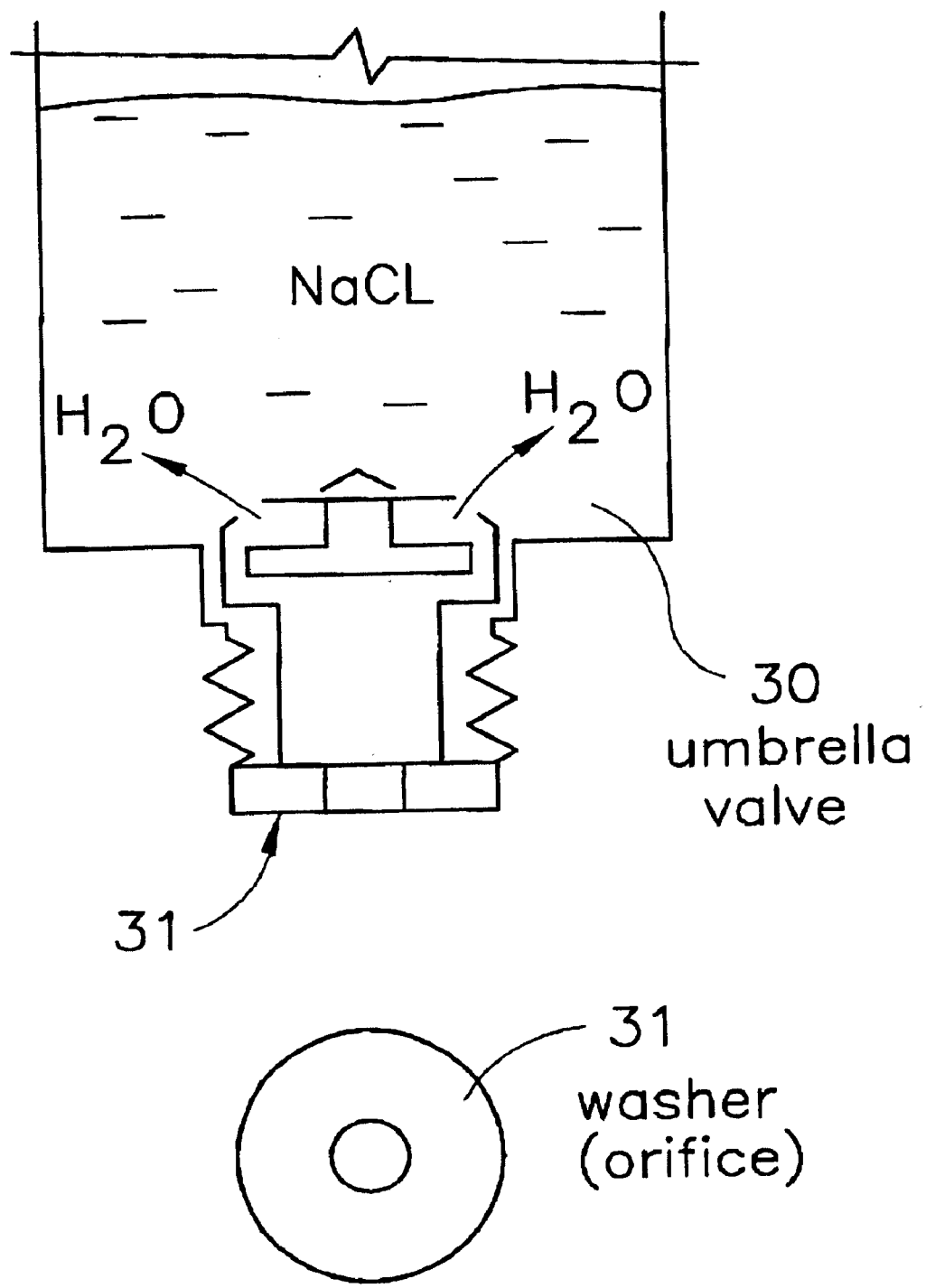

Other objects and advantages of this invention, including the simplicity and economy of the same, will further become apparent hereinafter, and in the drawings of which:

FIG. 1 is a side view, partly in section, showing one embodiment of the invention, and FIG. 2 is a sectional view of a normally-open pressure-responsive valve comprising one component of the self-regeneration system in accordance with this invention.

The specific forms of the invention selected for illustration in the drawings are intended to be exemplary only, and the following description is not intended to define or limit the scope of the invention, which is defined in the appended claims.

Turning now to FIG. 1, a water softener has a raw water inlet 10 for pressurized raw water leading into a resin chamber 11. A remote, user-controlled valve 12 is provided at any convenient location to open up or shut off the flow of incoming water so that, when the user desires to use soft water, it flows upwardly through the resin chamber 11 and is treated accordingly and delivered to the place of use. An upper valve 13 and a lower valve 14 are provided in chamber 11. They are both normally open, automatically closing valves in response to pressure. Thus, when water is requested by the user, it is introduced into the inlet 10, the pressure inherent in the raw water closes the valve 13 and the valve 14, causing the incoming water to flow upwardly through the resin chamber 11, with the treated water flowing out the outlet 15 for use.

According to this invention, the upper valve 13 is provided with a restricted opening, providing a leakage passageway 16, causing a limited amount of water to leak into an upper salt chamber 17, thereby making brine within the upper chamber 17. When the incoming water is later turned off after use by the user at valve 12, the brine chamber 17 which is located above the resin chamber 11 performs gravity leakage of the brine that was formed in the chamber 17, causing that brine to flow by gravity downwardly into the resin chamber and thus automatically recharging the resin in chamber 11 in preparation for its next use.

At the user's option the by-pass valve 20 may be switched to an open position, causing untreated water to flow under its own pressure into the inlet 10 and directly out of the outlet 15 without being treated by the resin in the chamber 11.

An important feature of this invention is the automatic upward leakage of water into the salt chamber 17, coupled with the production of brine therein, followed by automatic gravity downward leakage of the resulting brine after the water pressure has been turned off by the user. This saves the user the annoyance and trouble of manipulating a complicated network of pipes and valves, and going to various locations in a building to do so, just to place the water softening system in use, or to disconnect it from the existing plumbing circuits if desired.

It will be appreciated that the use of the valve 20 is optional. Further, the pressure closing lower drain valve 14 is optional in the sense that the automatic regeneration takes place even if the drain valve 14 is permanently closed. However, if the user desires to empty the resin chamber 11 after every usage of water, a normally open valve, which is pressure sensitive to close, may be used instead.

In FIG. 2, the valve 30 is in the optional form of a so-called umbrella valve, with an orifice disc 31 which slows down the flow through the valve when it has been opened under the influence of raw water pressure. The size of the orifice in the disc can be optimized in order to pre-select a suitable velocity of flow for the creation of brine in the upper tank 17. This, also, controls the rate of flow of the formed brine, downwardly after the pressure has been turned off by the user's actuation of the valve 12.

It will be appreciated that many different forms of flow restrictive means maybe used for the purpose of this invention, including the concept of deliberately fitting the valve loosely in its opening in a manner to permit slow leakage upwardly while the resin chamber 11 is under pressure, and downwardly when it is not. As another example, a restricted passageway may be cut through threads that are used in connecting the valve into its opening between the upper and lower tanks to provide leakage. Other means of obtaining such a restrictive flow will become immediately apparent to those skilled in the art, including the use of a valve that is incapable of closing instantly and therefore provides a time-regulated amount of water leakage into the upper salt tank before it completely closes. Similarly, such valve may be designed to open slowly when the water pressure is shut off, thereby controlling the rate of flow of brine down into the resin chamber 11.

The self-regenerating system of this invention can be employed by fitting it into a built-in plumbing system in a home or factory or example, or can even be a portable system needing only to be connected into a source of raw water under pressure. This greatly contributes to the utility and ease of use of the self-regenerating ion exchange water softener of this invention.

Although this invention has been disclosed with reference to specific forms, many variations may be incorporated into actual practice. A few variations have already been discussed herein. The use of an automatic drain for the brine after it has completed the resin regeneration step is optional, as are many other features, so long as the conversion of salt to brine during use of the softened water and the automatic gravity delivery of the resulting brine to the regeneration chamber are actuated automatically when the user turns the water on and subsequently turns it off.

These and other equivalent components and method steps are all intended to be included within the spirit and scope of the invention as defined in the appended claims.

What is claimed is:

1. A self-regenerating ion exchange water softener, comprising:
   (a) a resin chamber constructed to enclose a space for containing an ion exchange water softening resin,
   (b) said resin chamber having an inlet provided with a control connected to a source of softenable water under pressure for softening said water by contact with said resin in said chamber, and said resin chamber having an open outlet for use of said softened water,
   (c) a salt chamber located above said resin chamber and containing a water-soluble regeneration salt capable of regenerating said resin,
   (d) a fluid flow connection extending up and down between said salt chamber and said resin chamber,
   (e) a normally-open pressure-responsive valve positioned to control flow through said connection, said valve being positioned to sense an increase of water pressure in said resin chamber and to close said valve in response, and said valve having
   (f) a restricted passageway of reduced flow capacity to provide limited flow of pressurized water upwardly from said resin chamber when said pressure-responsive valve is subjected to pressure, to thereby mix said softenable water with said water-soluble salt in said upper chamber, and to relieve the pressure of said softenable water in said resin chamber upon closing and control, causing the resulting salt solution to flow downwardly by gravity at a limited flow rate to said resin chamber through said passage to mix with said resin and regenerate the same.

2. The water softener defined in claim 1, including a pressure-sensitive normally open drain valve at the bottom of said resin chamber.

3. The water softener defined in claim 1, including a by-pass and outlet, with control valve, for optional use of untreated water without passing through said resin chamber.

4. A method of self-regenerating an ion exchange resin which comprises introducing softenable water under pressure into a tank that contains said resin, in response to said pressure expressing a controlled, limited water flow from said tank upwardly to an upper chamber containing salt, to mix with said salt to make a salt brine therein, and then relieving said pressure in said resin tank to cause said brine to flow by gravity downwardly into said resin tank to regenerate said resin.

* * * * *